US012457160B2

(12) United States Patent
Segev et al.

(10) Patent No.: US 12,457,160 B2
(45) Date of Patent: Oct. 28, 2025

(54) BANDWIDTH AVERAGING IN A STOCHASTIC SYSTEM

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/489,555

(22) Filed: Oct. 18, 2023

(65) Prior Publication Data
US 2025/0133001 A1 Apr. 24, 2025

(51) Int. Cl.
*H04L 43/0882* (2022.01)
*H04L 47/52* (2022.01)

(52) U.S. Cl.
CPC ........ *H04L 43/0882* (2013.01); *H04L 47/527* (2013.01)

(58) Field of Classification Search
CPC .... H04B 2001/1054; H04L 2012/5632; H04L 47/50; H04L 47/522; H04L 47/6215; H04L 47/6265; H04N 5/917; H04W 28/20
See application file for complete search history.

(56) References Cited

U.S. PATENT DOCUMENTS

| | | | |
|---|---|---|---|
| 5,943,316 A * | 8/1999 | Davis .................... | H04W 28/18 370/468 |
| 8,045,563 B2 * | 10/2011 | Lee ....................... | H04L 47/527 370/418 |
| 9,563,369 B2 | 2/2017 | Quach et al. | |
| 10,111,225 B2 * | 10/2018 | Zhang .................... | H04B 1/713 |
| 10,587,527 B1 | 3/2020 | Paulzagade et al. | |
| 11,055,243 B1 | 7/2021 | Pan et al. | |
| 2003/0223370 A1 * | 12/2003 | Jain ......................... | H04L 47/10 370/395.43 |
| 2017/0034068 A1 * | 2/2017 | Watts .................. | H04L 12/6418 |
| 2018/0287954 A1 * | 10/2018 | Dinan ................ | H04L 47/6265 |
| 2022/0019360 A1 | 1/2022 | La Fratta et al. | |
| 2022/0237133 A1 | 7/2022 | Simionescu et al. | |

FOREIGN PATENT DOCUMENTS

CN 102904835 B * 7/2015

OTHER PUBLICATIONS

Jung Kyu Park et al. "SSD Bandwidth Distributing I/O Scheduler Considering Garbage Collection", Department of Computer Software Engineering, Changshin University, Korea., Jan. 29, 2018.

* cited by examiner

*Primary Examiner* — Chirag R Patel
(74) *Attorney, Agent, or Firm* — Patterson + Sheridan, LLP

(57) ABSTRACT

Instead of maximizing the possible bandwidth of device, utilize time slice credits (TSC), to ensure bandwidth average over a sliding window. When the average is ensured over a sliding window, the device should not care when the host decides to sample a 100 mSec for example, as the average will always be correct. By utilizing set percentage of predetermined allotment for the average bandwidth requirement, the system can give out credit on a predetermined interval. The credit is given out based on usage and once credit is depleted, data cannot be sent until more credit is accumulated. When data is not sent, the system is given a chance to accumulate credit to increase the amount of data sent. Once credit is at a level high enough to send data the device will send the data, but not at a speed that will surpass the average bandwidth requirement.

20 Claims, 6 Drawing Sheets

BANDWIDTH AVERAGING IN A STOCHASTIC SYSTEM

BACKGROUND OF THE DISCLOSURE

Field of the Disclosure

Embodiments of the present disclosure generally relate to improving bandwidth accuracy for any window of time.

Description of the Related Art

In Embedded Systems Software (ESS) devices, one of the strict parameters is to have a known steady (average) bandwidth. For example the bandwidth is measured as an average over a 100 mSec, and at accuracy of 5%. However, there is no synchronization between the host and the device on when the 100 mSec window starts. The Solid State Drive (SSD) controller is built to support maximum possible bandwidth. The problem is seen when trying to slow the device down to a fixed (non-max) bandwidth.

In a Firmware (FW) based approach, write commands are not going directly to the read Direct Memory Access (DMA) but go to the FW first. In this mode, both read commands and write commands can be scheduled by the FW to meet the required average performance. In this approach the bandwidth is limited because the FW gets overloaded with the write commands.

In a write throttling based approach, the queue adds a delay before sending commands to the Remote Direct Memory Access (RDMA). This in turn will slow down the device. However, this is not enough for average, possibly during 10 mSec (out of 100 mSec) there are no commands at all. So, there is nothing "to slow" down. However, in this case, the user would want the device to provide more than the average for the other 90 mSec to compensate.

In a credit based approach, when the user does not send data, credit is accumulated. With the accumulation of credit later data can be sent faster. However, this approach is good only the time of when the 100 mSec window is measured is known.

Therefore, there is a need in the art for improving the accuracy of the bandwidth at any time when the bandwidth is measured.

SUMMARY OF THE DISCLOSURE

Instead of maximizing the possible bandwidth of device, utilize time slice credits (TSC), to ensure bandwidth average over a sliding window. When the average is ensured over a sliding window, the device should not care when the host decides to sample a 100 mSec for example, as the average will always be correct. By utilizing set percentage of predetermined allotment for the average bandwidth requirement, the system can give out credit on a predetermined interval. The credit is given out based on usage and once credit is depleted, data cannot be sent until more credit is accumulated. When data is not sent, the system is given a chance to accumulate credit to increase the amount of data sent. Once credit is at a level high enough to send data the device will send the data, but not at a speed that will surpass the average bandwidth requirement.

In one embodiment, a data storage device comprises: a memory device; and a controller coupled to the memory device, wherein the controller is configured to: receive an average bandwidth accuracy requirement; determine a number of credits to issue to meet the average bandwidth accuracy requirement; start a timer; determine that there is any data to send; determine whether there are sufficient credits available to send the data; and either: send the data if the determination is that there are sufficient credits; or wait for sufficient credits and then send the data.

In another embodiment, a data storage device comprises: a memory device; and a controller coupled to the memory device, wherein the controller is configured to: initialize a plurality of counters; fill a first counters of the plurality of counters with credit; fill a remainder of counters of the plurality of counters with 0 credits; start a timer; determine that there is data to send; determine that the credit is insufficient to send data; accumulate additional credits in the remainder of counters; determine that there is sufficient credit to send the data, wherein the credit is found in the plurality of counters; send the data; and reduce credit from one or more counters of the plurality of counters.

In another embodiment, a data storage device comprises: means to store data; and a controller coupled to the means to store data, wherein the controller is configured to: write data to the means to store data; fetch commands from a host device; parse the fetched commands; add credits to a plurality of counters; subtract credits from the plurality of counters; and maintain a timer for coordinating the adding and subtracting of credits.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of maximizing the possible bandwidth of device, utilize time slice credits (TSC), to ensure bandwidth average over a sliding window. When the average is ensured over a sliding window, the device should not care when the host decides to sample a 100 mSec for example, as the average will always be correct. By utilizing set percentage of predetermined allotment for the average bandwidth requirement, the system can give out credit on a predetermined interval. The credit is given out based on usage and once credit is depleted, data cannot be sent until more credit is accumulated. When data is not sent, the system is given a chance to accumulate credit to increase the amount of data sent. Once credit is at a level high enough to send data the device will send the data, but not at a speed that will surpass the average bandwidth requirement.

Figure 1:
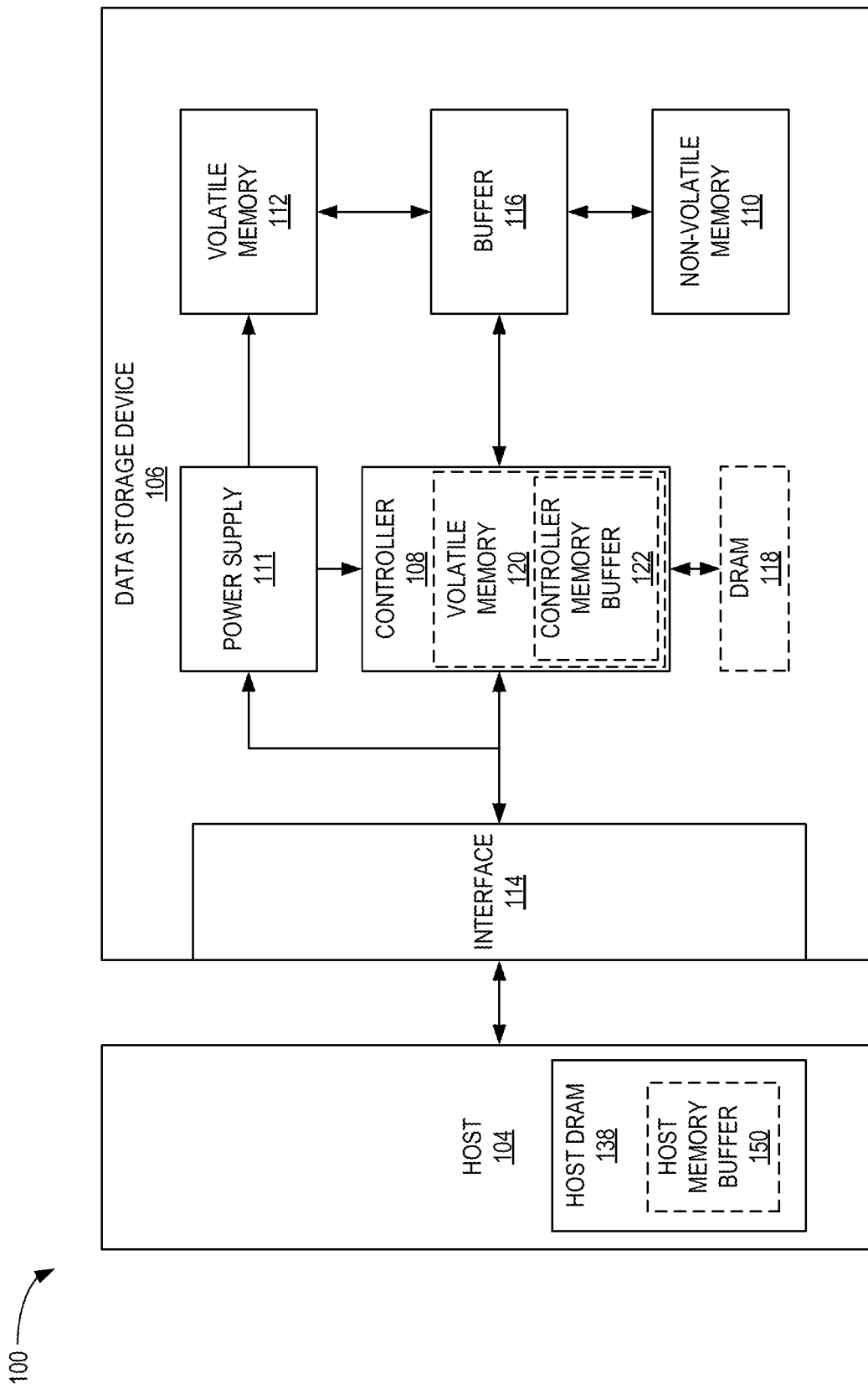
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
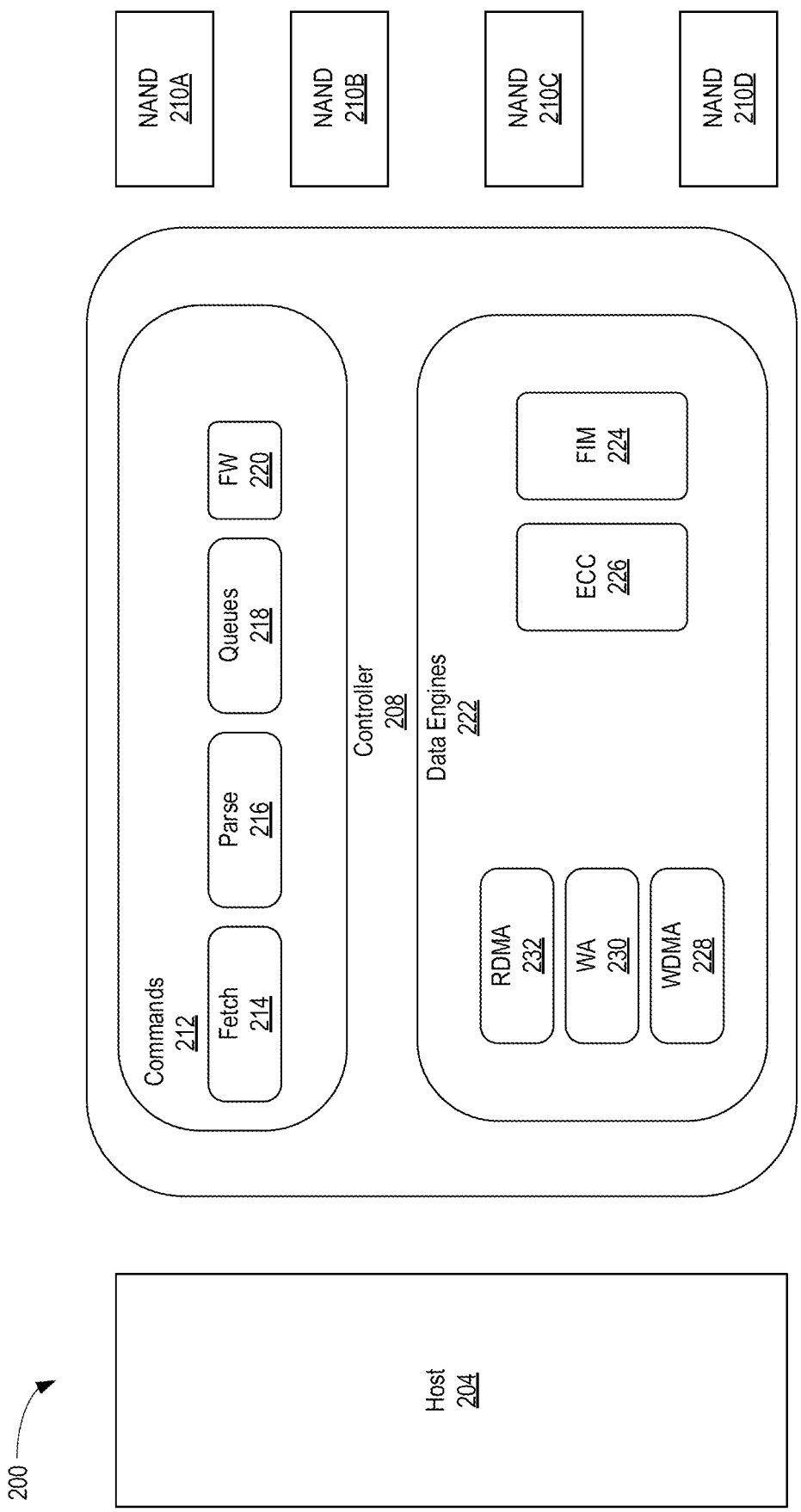
FIG. 2 is a block diagram illustrating a SSD system without averaging modules, according to one embodiment.

FIG. 2 is a block diagram illustrating a SSD system 200 without averaging modules, according to one embodiment. The SSD system 200 comprises a host 204, a controller 208, and a plurality of memory devices (e.g., NANDs) 210A-D. The controller 208 comprises a command module 212 comprised of a fetch module 214, parse module 216, queues 218, and FW 220. The controller 208 further comprises a data engine 222 comprised of a RDMA 232, a Write Aggregation (WA) module 230, a Write Direct Memory Access (WDMA) 228, an Error Correction Code (ECC) module 226, and a flash interface module (FIM) 224. Of the two main components of the controller 208, the data engine 222 handles data transfers and the command module 212 handles the commands.

The read path operates by the fetch module 214 fetching the commands. Once the commands are fetched, the parse module 216 will parse the commands. The parsed commands are then held in the queue 218 until the FW 220 is ready. Once the FW 220 is ready, the FW 220 pulls commands from the queues 218. The FW 220 will determine the location of the data in the NAND 210A-D (logical to physical (L2P)) and trigger the data engine 222. The FIM 224 will read the data from the NAND 210A-D. The ECC module 226 will fix any bit flips found in the NAND 210A-D. The WDMA 228 is used to send (write) the data to the host 204.

The write path operates by the fetch module 214 fetching the commands. Once the commands are fetched the parse module 216 will parse the commands. The parsed commands are then pushed by the queue 218 to the RDMA 232 when the RDMA 232 is ready. Once the RDMA 232 is ready, the RDMA 232 brings (reads) data from the host 204. As data arrives from the host 204, the WA 230 accumulates into NAND-page-size parts and triggers the FW 220. The FW 220 decides where to write the data to, and triggers the ECC 226 and prepares the FIM 224 to push the data to the NAND 210A-D.

The differences between the read and write paths emerge from the fact that the controller 208 can read the data from the host 204 (write command) before deciding where to put the data in the NAND 210A-D. While for read commands, the FW 220 needs to first locate the demanded data.

While the problem of averaging exists for both reads and writes, the focus herein is on the write path. As the data transfers between host 204 and the controller 208 the data does not go through the FW 220 first, hence the problem is less manageable. Though, the same solution is valid for the read path as well. As will be discussed herein, the bandwidth can be limited to ensure an average within a predetermined window. More particularly, the disclosure discusses the idea of using time slide credits to ensure bandwidth average over a sliding window. When the average is ensured over a sliding window, the device should not care when the host decides to sample a, for example, 100 ms, as the host device will always be correct or rather within about a 5 percent correctness requirement.

Figure 3:
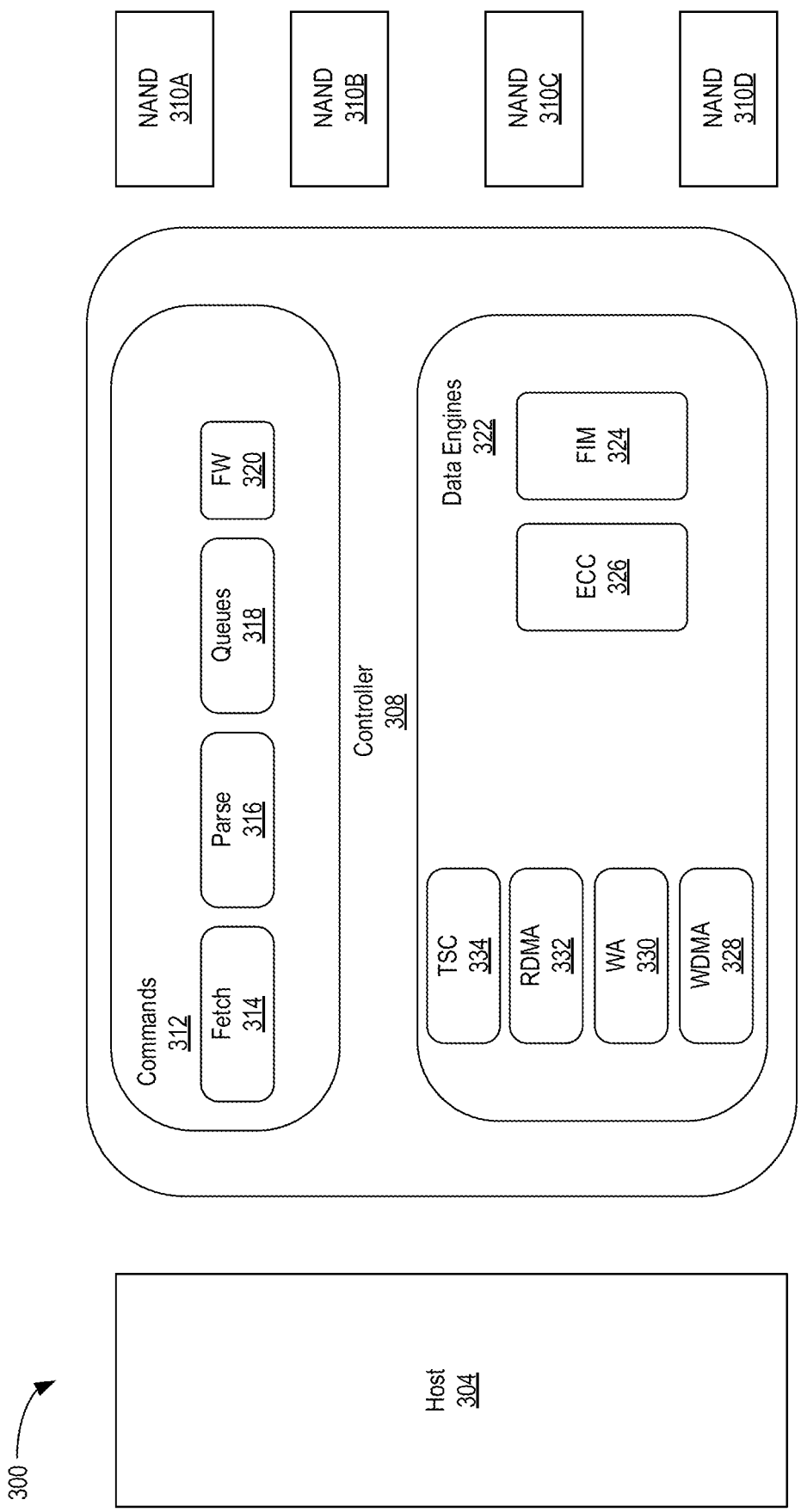
FIG. 3 is a block diagram illustrating a SSD system with time sliced credit, according to one embodiment.

FIG. 3 is a block diagram illustrating a SSD system 300 with time sliced credit (TSC), according to one embodiment. The SSD system 300 comprises a host 304, a controller 308, and a plurality of memory devices (e.g., NANDs) 310A-D. The controller 308 comprises a command module 312 including a fetch module 314, parse module 216, queues 318, and FW 320. The controller 308 further comprises a data engine 322 including a TSC module 334, a RDMA module 332, a WA module 330, WDMA module 328, an ECC module 326, and a FIM 324. Of the two main components of the controller 308, the data engine 322 handles data transfers and the command module 312 handles the commands.

The write path consists of the fetch module 314 fetching the commands. Once the commands are fetched, the parse module 316 will parse the commands. The parsed commands are then pushed by the queue 318 to the TSC module 334 when the TSC module 334 is ready. Once the TSC module 334 is ready, the TSC 334 ensures the write command (data read) can occur without violating the average bandwidth accuracy requirement, and forward the command to the RDMA 332. The RDMA module 332 brings (read) data from the host 304. As data arrives from the host 304, the WA module 330 accumulates into NAND-page-size parts and triggers the FW 320. The FW 320 decides where to write the data to, and triggers the ECC module 326 and prepares the FIM 324 to push the data to the NAND 310A-D.

Figure 4:
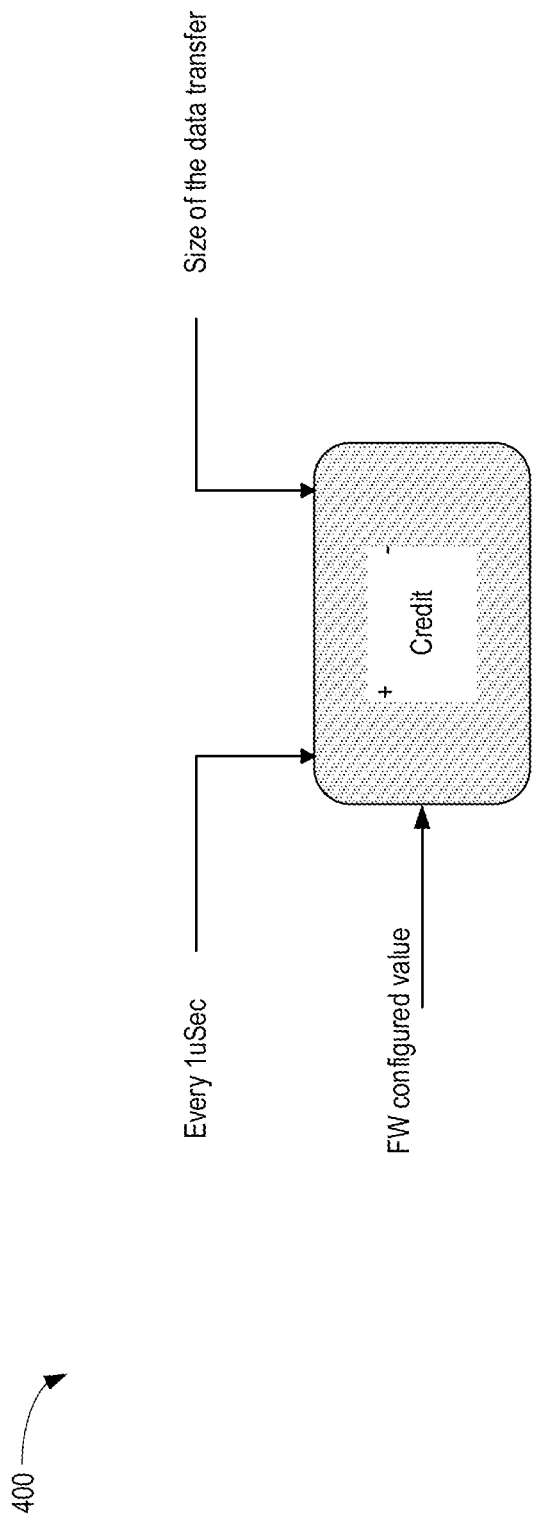
FIG. 4 is a diagram illustrating a simple credit, according to one embodiment.

FIG. 4 is a diagram illustrating a simple credit 400, according to one embodiment. To better understand the TSC, such as the TSC module 334 of FIG. 3, a description of the simple credit-based solution is shown. In this case, every 1 uSec (as example) some credits are provided (FW configured value) e.g., 8 KB. This in turn means that over 100 mSec, 0.8 GB worth of credit (this matches 8 GB/sec bandwidth) is added. Whenever data is sent, the credit is decreased by the size of sent data. When there are not enough credits to send the next transaction, the next transaction will not get sent. The limit in this approach is that the limit does not meet averaging on any 100 mSec window.

Figure 5:
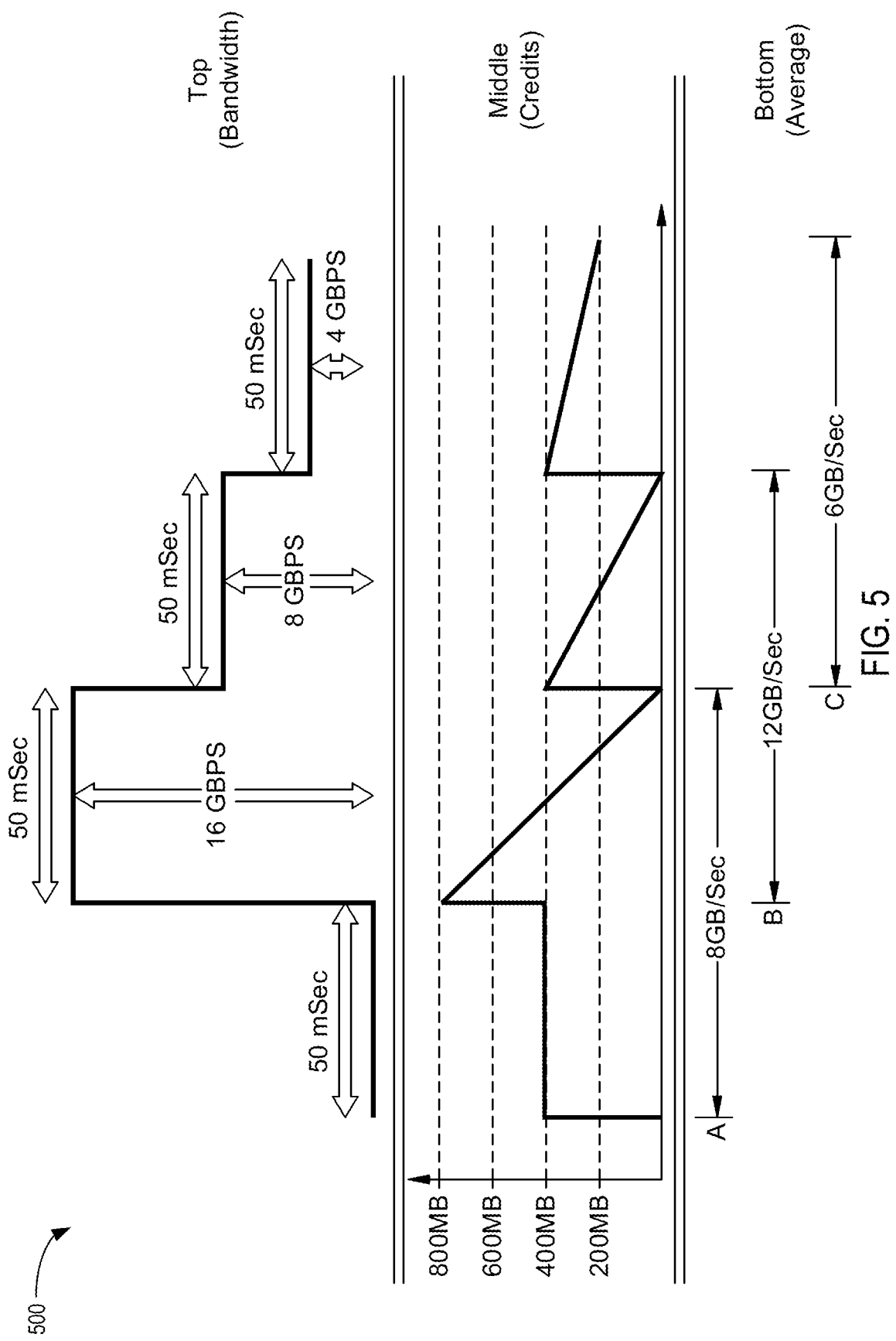
FIG. 5 is a diagram illustrating a graph showing a stochastic system, according to one embodiment.

FIG. 5 is a diagram illustrating a graph showing a stochastic system 500, according to one embodiment. The stochastic system 500 is supporting 16 GB/sec rate, with an average bandwidth accuracy requirement of 50% bandwidth limit (8 GB/average). At the beginning of the stochastic system 500, there is no command for the first 50 mSec. For those first 50 mSec there is a credit given to the stochastic system 500 of 400 MB. After the completion of the 50 mSec there is another 400 MB of credit given to the stochastic system 500. At that time there is a total of 800 MB of credit, so the stochastic system 500 is able to send data at the full speed of 16 GB/sec for the next 50 mSec. At the completion of sending that data at 16 GB/sec for 50 mSec the credit will depleted. At the start of the next 50 mSecs, a new credit of 400 MB is given to the stochastic system 500. With the 400 MB credit the stochastic system 500 can send data at max 8 GB/sec for the next 50 mSec. At the completion of sending the data at 8 BGPs for 50 mSec the credit is depleted. At the start of the next 50 mSecs a new credit of 400 MB is given to the stochastic system 500. With the 400 MB credit the stochastic system 500 can send data at max 4 GB/sec for the next 50 mSec.

For the averages of data sent, at the interval "A" the stochastic system 500 sent data at an average of 8 GB/sec for 100 mSec. At the interval "C" the stochastic system 500 sent data at an average of 6 GB/sec for 100 mSec. At the interval "B" the stochastic system 500 sent data at an average of 12 GB/sec for 100 mSec which violates the average bandwidth accuracy requirement. To meet the average bandwidth requirement of a "sliding window measurement" at 5% error, 20 credit counters are used (5%*20=100%). Each such credit counter is responsible for 5% of the 100 mSec (5 mSec). At each point of time, the decision to allow sending data, depends on having available credits in any of the previous 20 counters. When 5 mSec passes, the oldest credit counter is dropped, and a new credit counter is generated. Whenever sending data, the oldest counter containing credit, gets decremented.

Figure 6:
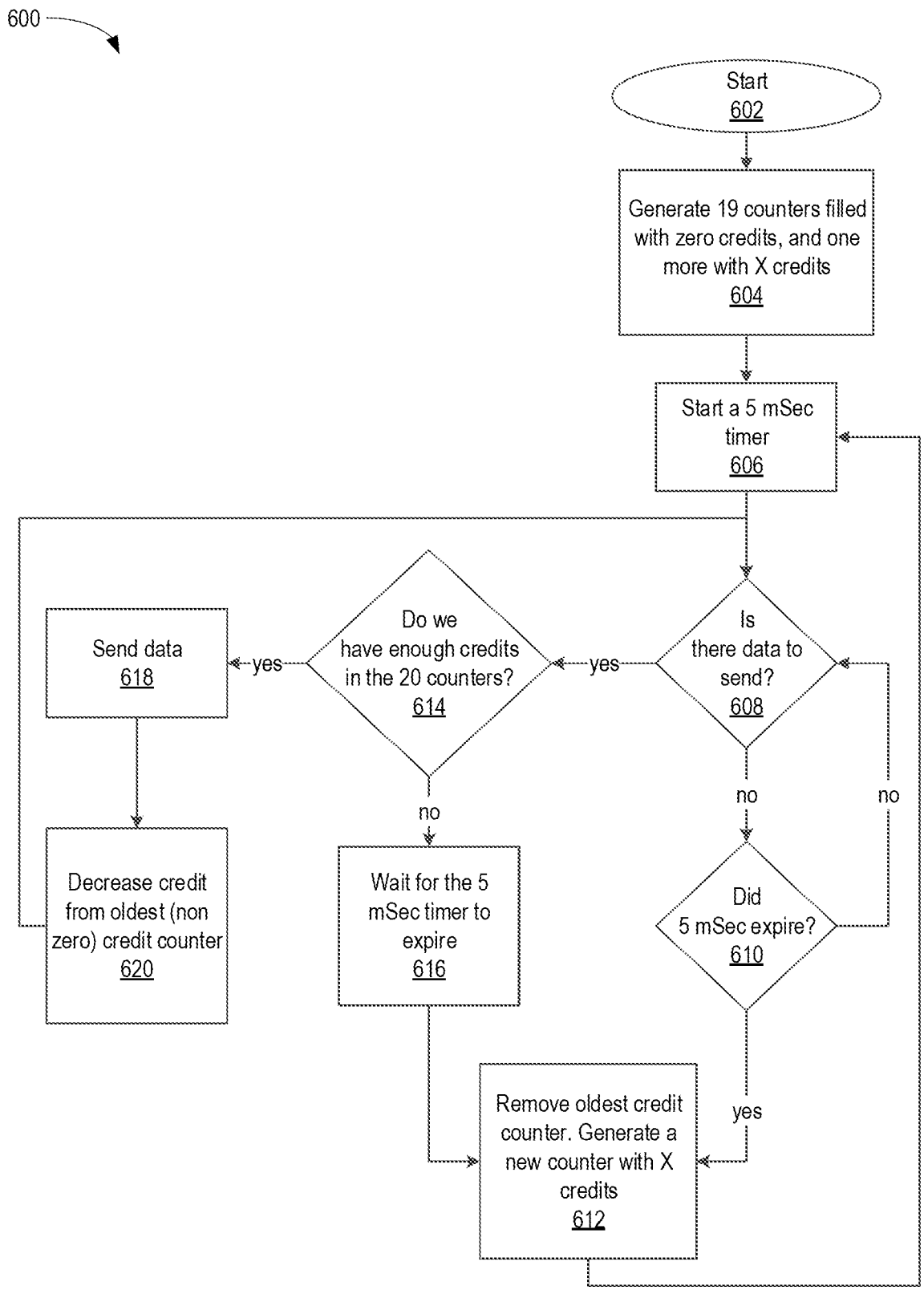
FIG. 6 is a flowchart illustrating a method for time sliced credit (TSC), according to certain embodiments.

FIG. 6 is a flowchart illustrating a method 600 for TSC, according to certain embodiments. The method 600 begins at block 602 and the method 600 proceeds to block 604. At block 604, the TSC, such as the TSC module 334 of FIG. 3, generates 19 counters filled with zero credits, and one more with "X" credits. For example, "X" is dependent upon the average bandwidth accuracy requirement (5%), therefore 8 GB/sec average bandwidth accuracy requirement, and this value will be 400 MB the 5 mSec. At block 606, the TSC starts a 5 mSec timer. The timer is 5 mSecs because that is 5% of the 100 mSec average bandwidth accuracy requirement. At block 608, the TSC determines whether there is data to send. If the TSC determines that there is no data to send, then the method 600 proceeds to block 610. At block 610, the TSC determines if the 5 mSec has expired. If the TSC determines that the 5 mSec has not expired, then the method 600 returns to block 608. If the TSC determines that the 5 mSec has expired, then the method 600 proceeds to block 612. At block 612, the TSC removes the oldest credit counter and generates a new counter with "X" credits and the method 600 returns to block 606.

If the TSC determines that there is data to send, then the method 600 proceeds to block 614. At block 614, the TSC determines whether there is enough credits in the 20 counters. If the TSC determines that there is not enough credits in the 20 counters, then the method 600 proceeds to block 616. It should be noted, if there is not enough credits in one bucket, the TSC will continue removing more credits from the next oldest credit counter. Credits will be removed until all demanded credits are removed and the method 600 will proceeds to block 616. At block 616, the TSC waits for the 5 mSec timer to expire and the method 600 returns to block 612. If the TSC determines that there is enough credits in the 20 counters, then the method 600 proceeds to block 618. At block 618, the TSC sends the data and the method 600 proceeds to block 620. At block 620, the TSC decreases the credit from the oldest (non-zero) credit counter and the method returns to block 608.

This last action (removing any remains from oldest credit counter) ensures that the device does not reach the case where there "over credit" to allow the device to reach a higher than average bandwidth, such as interval "B" of FIG. 5, on any measured 100 mSec. The device can overshoot by 5% (which is allowed) of the average.

By splitting the measured length into bins (number depends on the average bandwidth accuracy requirement) we allow the bandwidth measurement to be correct at any measured time, as with a sliding-time window. The TSC improves the predictability of the average bandwidth without complex FW involvement.

In one embodiment, a data storage device comprises: a memory device; and a controller coupled to the memory device, wherein the controller is configured to: receive an average bandwidth accuracy requirement; determine a number of credits to issue to meet the average bandwidth accuracy requirement; start a timer; determine that there is any data to send; determine whether there are sufficient credits available to send the data; and either: send the data if the determination is that there are sufficient credits; or wait for sufficient credits and then send the data. The controller is configured to set the timer for an increment equal to a percentage of a sample size set by a host device, wherein the percentage is equal to the average bandwidth accuracy requirement. The controller is configured to remove credit after sending the data. The credit is removed from an oldest non zero credit counter. The controller is configured to determine which credit counter is an oldest credit counter. The controller is configured to add credit to a counter after the timer is incremented for a first segment. The waiting comprises waiting for the timer to expire. The controller is configured to remove all credits from a credit counter when the timer has expired, wherein restart the timer when the timer has expired. The credit counter is an oldest credit counter of a plurality of credit counters. The controller is configured to generate a new counter after removing the oldest credit. The controller is configured to add credit to the new counter. A total number of credits is insufficient to exceed a higher than average bandwidth on any measured period of time set by a host device.

In another embodiment, a data storage device comprises: a memory device; and a controller coupled to the memory device, wherein the controller is configured to: initialize a plurality of counters; fill a first counters of the plurality of counters with credit; fill a remainder of counters of the plurality of counters with 0 credits; start a timer; determine that there is data to send; determine that the credit is insufficient to send data; accumulate additional credits in the remainder of counters; determine that there is sufficient credit to send the data, wherein the credit is found in the plurality of counters; send the data; and reduce credit from one or more counters of the plurality of counters. A number of the plurality of counters is equal to 1 divided by a correctness requirement. The sample time period is set by a host device. A correctness requirement is set by the host device. The controller includes a time slide credit module.

In another embodiment, a data storage device comprises: means to store data; and a controller coupled to the means to store data, wherein the controller is configured to: write data to the means to store data; fetch commands from a host device; parse the fetched commands; add credits to a plurality of counters; subtract credits from the plurality of counters; and maintain a timer for coordinating the adding and subtracting of credits. The controller is configured to subtract credits from an oldest counter of the plurality of counters when the timer has expired. The controller is configured to generate a new counter with credits when the timer expires, wherein the controller is further configured to restart a counter from the plurality of counters when the counter has expired.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive an average bandwidth accuracy requirement;
determine a number of credits to issue to meet the average bandwidth accuracy requirement;
start a timer;
determine that there is any data to send;
determine whether there are sufficient credits available to send the data; and
either:
send the data if the determination is that there are sufficient credits; or
wait for sufficient credits and then send the data, wherein the controller is configured to set the timer for an increment equal to a percentage of a sample size set by a host device, wherein the percentage is equal to the average bandwidth accuracy requirement.

2. The data storage device of claim 1, wherein the controller is configured to remove credit after sending the data.

3. The data storage device of claim 1, wherein the controller is configured to add credit to a counter after the timer is incremented for a first segment.

4. The data storage device of claim 1, wherein the waiting comprises waiting for the timer to expire.

5. The data storage device of claim 4, wherein the controller is configured to remove all credits from a credit counter when the timer has expired, wherein restart the time when the timer has expired.

6. The data storage device of claim 1, wherein a total number of credits is insufficient to exceed a higher than average bandwidth on any measured period of time set by a host device.

7. The data storage device of claim 1, wherein the controller is configured to
initialize a plurality of counters;
fill a first counters of the plurality of counters with credit;
fill a remainder of counters of the plurality of counters with 0 credits;
determine that the credit is insufficient to send data;
accumulate additional credits in the remainder of counters;
determine that there is sufficient credit to send the data, wherein the credit is found in the first counter or any other counters starting with the first counter and up to the remainder of counters;
send the data; and
reduce credit from one or more counters of the plurality of counters.

8. The data storage device of claim 7, wherein a number of the plurality of counters is equal to 1 divided by a correctness requirement.

9. The data storage device of claim 8, wherein a sample time period is set by a host device.

10. The data storage device of claim 9, wherein a correctness requirement is set by the host device.

11. The data storage device of claim 9, wherein the controller includes a time slide credit module.

12. The data storage device of claim 1, wherein the controller is configured to:
   write data to the memory device;
   fetch commands from a host device;
   parse the fetched commands;
   add credits to a plurality of counters;
   subtract credits from the plurality of counters; and
   maintain the timer for coordinating the adding and subtracting of credits.

13. The data storage device of claim 12, wherein the controller is configured to subtract credits from an oldest counter of the plurality of counters when the timer has expired.

14. The data storage device of claim 13, wherein the controller is configured to generate a new counter with credits when the timer expires, wherein the controller is further configured to restart a counter from the plurality of counters when the counter has expired.

15. The data storage device of claim 1, wherein the controller is configured to generate a new counter and remove an oldest counter.

16. A data storage device, comprising:
   a memory device; and
   a controller coupled to the memory device, wherein the controller is configured to:
      receive an average bandwidth accuracy requirement;
      determine a number of credits to issue to meet the average bandwidth accuracy requirement;
      start a timer;
      determine that there is any data to send;
      determine whether there are sufficient credits available to send the data; and
      either:
         send the data if the determination is that there are sufficient credits; or
         wait for sufficient credits and then send the data, wherein the controller is configured to remove credit after sending the data, wherein the credit is removed from an oldest non zero credit counter.

17. The data storage device of claim 16, wherein the controller is configured to determine which credit counter is an oldest credit counter.

18. A data storage device, comprising:
   a memory device; and
   a controller coupled to the memory device, wherein the controller is configured to:
      receive an average bandwidth accuracy requirement;
      determine a number of credits to issue to meet the average bandwidth accuracy requirement;
      start a timer;
      determine that there is any data to send;
      determine whether there are sufficient credits available to send the data; and
      either:
         send the data if the determination is that there are sufficient credits; or
         wait for sufficient credits and then send the data, wherein the waiting comprises waiting for the timer to expire, wherein the controller is configured to remove all credits from a credit counter when the timer has expired, wherein restart the time when the timer has expired, wherein the credit counter is an oldest credit counter of a plurality of credit counters.

19. The data storage device of claim 18, wherein the controller is configured to generate a new counter after removing the oldest credit.

20. The data storage device of claim 19, wherein the controller is configured to add credit to the new counter.

* * * * *